United States Patent
Elkins, II et al.

(10) Patent No.: US 7,266,274 B2
(45) Date of Patent: Sep. 4, 2007

(54) PRE-CONNECTORIZED FIBER OPTIC DISTRIBUTION CABLE HAVING OVERMOLDED ACCESS LOCATION

(75) Inventors: Robert B. Elkins, II, Hickory, NC (US); Thomas Theuerkorn, Hickory, NC (US); Lars K. Nielsen, Denver, NC (US); James P. Luther, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 10/980,704

(22) Filed: Nov. 3, 2004

(65) Prior Publication Data

US 2006/0093278 A1   May 4, 2006

(51) Int. Cl.
    *G02B 6/44* (2006.01)
(52) U.S. Cl. .................................... 385/100; 385/134
(58) Field of Classification Search .................... None
    See application file for complete search history.

(56) References Cited

U.S. PATENT DOCUMENTS

| | | | |
|---|---|---|---|
| 4,884,863 A | 12/1989 | Throckmorton | 350/96.2 |
| 4,961,623 A | 10/1990 | Midkiff et al. | 350/96.2 |
| 5,004,315 A | 4/1991 | Miyazaki | 350/96.15 |
| 5,042,901 A | 8/1991 | Merriken et al. | 385/135 |
| 5,121,458 A | 6/1992 | Nilsson et al. | 385/100 |
| 5,125,060 A | 6/1992 | Edmundson | 385/100 |
| 5,210,812 A | 5/1993 | Nilsson et al. | 385/100 |
| 5,440,665 A | 8/1995 | Ray et al. | 385/135 |
| 5,528,718 A | 6/1996 | Ray et al. | 385/136 |
| 5,657,413 A | 8/1997 | Ray et al. | 385/139 |
| 5,778,122 A | 7/1998 | Giebel et al. | 385/55 |
| 5,892,870 A * | 4/1999 | Fingler et al. | 385/59 |
| RE36,592 E | 2/2000 | Giebel et al. | 385/100 |

(Continued)

FOREIGN PATENT DOCUMENTS

DE   3537684   4/1987

(Continued)

OTHER PUBLICATIONS

Patent Abstract of Japan, 2003177254, Jun. 27, 2003.

(Continued)

*Primary Examiner*—Frank G. Font
*Assistant Examiner*—Eric Wong
(74) *Attorney, Agent, or Firm*—Jeffrey S. Bernard

(57) ABSTRACT

A pre-connectorized fiber optic distribution cable assembly includes a plurality of optical fibers and at least one mid-span access location along the length of the distribution cable. At least one of the optical fibers is accessed, terminated and then connectorized at the mid-span access location to an optical connector disposed within a receptacle. The mid-span access location, the accessed, terminated and connectorized optical fiber, the optical connector and at least a portion of the receptacle are encapsulated with a protective overmolded shell. A tether including at least one optical fiber connectorized at a first end of the tether is optically connected to the optical connector through the receptacle. A second end of the tether opposite the first end terminates in a network optical connection terminal, thereby compensating for a span length measurement difference between the actual location of the mid-span access and the desired location of the optical connection terminal.

23 Claims, 7 Drawing Sheets

U.S. PATENT DOCUMENTS

| | | | |
|---|---|---|---|
| RE37,028 E | 1/2001 | Cooke et al. | 385/112 |
| 6,466,725 B2 | 10/2002 | Battey et al. | 385/135 |
| 6,619,697 B2 * | 9/2003 | Griffioen et al. | 285/126.1 |
| 6,621,975 B2 | 9/2003 | Laporte et al. | 385/135 |
| 2005/0265672 A1 * | 12/2005 | Theuerkorn et al. | 385/100 |

FOREIGN PATENT DOCUMENTS

| | | |
|---|---|---|
| EP | 0512811 A | 5/1992 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-054204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001116968 | 4/2001 |

OTHER PUBLICATIONS

Tyco Electronics Raychem Product Sheet, FITS FOSC—Factory Installed Termination System for Fiber Optic Cable Splices, 1999, 2 pages.

* cited by examiner

PRE-CONNECTORIZED FIBER OPTIC DISTRIBUTION CABLE HAVING OVERMOLDED ACCESS LOCATION

BACKGROUND OF THE INVENTION

1. Field of the Invention

The present invention relates generally to a pre-connectorized fiber optic distribution cable and, more particularly, to a pre-connectorized fiber optic distribution cable having an overmolded mid-span access location that compensates for span length measurement differences.

2. Description of the Related Art

Optical fiber is increasingly being used for a variety of broadband applications including voice, video and data transmissions. As a result, there is a need for connecting remote locations to a fiber optic distribution cable in order to provide broadband services to an end user, commonly referred to as a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx." networks. To provide these services to the subscriber, FTTx networks must include a large number of interconnection points, also referred to herein as "tap points," at which one or more optical fibers of a distribution cable are interconnected with optical fibers of one or more cables leading to a subscriber location. In addition, in order to reduce installation labor costs in FTTx networks, communications service providers are increasingly demanding factory-prepared interconnection solutions, commonly referred to as "plug-and-play" type systems.

To supply the large number of tap points needed and to satisfy the demand for plug-and-play systems, it is apparent that more efficient methods of providing mid-span access locations along the length of a distribution cable are needed. Presently, to perform a mid-span access of a distribution cable, a field technician first removes a section of the cable sheath at a convenient location along a previously installed distribution cable. Once the sheath is removed, the technician gains access to preselected optical fibers through the cable sheath, severs the accessed optical fibers and withdraws a useable length of the terminated optical fibers from the distribution cable. The useable length of the terminated optical fibers provides the field technician with sufficient length to splice one or more optical fibers of a cable comprising a lesser amount of optical fibers than the distribution cable (typically referred to as a "drop cable") to the preselected optical fibers of the distribution cable. After splicing is completed, the mid-span access location is typically covered using an enclosure designed to protect the splices and the exposed section of the distribution cable. A benefit to this approach is that the distribution cable may be installed without consideration to the proximity of the mid-span access location to a convenient location in the network, such as a telephone pole, hand-hole or optical connection terminal. Since mid-span access is performed in the field following installation of the distribution cable, the field technician may position the mid-span access at any desired location in the network along the length of the distribution cable. The relatively difficult and time consuming process of creating the mid-span access, however, must be accomplished by a highly skilled technician at a significant cost and under less than ideal field working conditions.

Several approaches have been developed to overcome the disadvantages of accessing, terminating and splicing optical fibers in the field. In one approach, the splicing of drop cables to the distribution cable is performed at a factory during the manufacturing of the cable. The preterminated distribution cable, including the main cable, drop cables and associated splice closures, are assembled and wound onto a cable reel to be delivered to the service provider for installation in the network. Accordingly, favorable conditions in the factory for making high quality optical splices may be utilized, thereby increasing splice quality and also reducing the difficulty and expense, and the unfavorable conditions associated with splicing in the field. One disadvantage of this approach is that the drop cables and the relatively bulky and inflexible splice closures are attached to the distribution cable prior to installation. Accordingly, installation through small diameter conduits and over sheave wheels and pulleys is substantially more difficult, and sometimes impossible. Another disadvantage is the fact that if a mid-span access location is unused following installation, the expensive and obtrusive splice closure and drop cables remain attached to the distribution cable. More importantly, drop cables attached to the distribution cable in the factory during manufacture have a predetermined length. As a result, improper location of the mid-span access location due to differences between the pre-engineered span length measurement and the actual span length measurement following installation of the distribution cable can only be mitigated using the predetermined length of drop cable provided from the factory. Such differences, referred to herein as "span length measurement differences" typically result from network measurement miscalculations, installation errors, and differences between the proposed locations of telephone poles, hand holes, pedestals, etc. and their installed locations. If the mid-span access location on the installed distribution cable is located too far from the desired location, the drop cable may not have sufficient length. On the other hand, if the mid-span access location on the installed distribution cable is located too near the desired location, an excessive amount of drop cable slack must be managed. In contrast, a pre-connectorized fiber optic distribution cable having a predetermined mid-span access location that provides access to the connectorized optical fibers allows a field technician to readily interconnect a tether having a customized length to the distribution cable following installation to compensate for any span length measurement differences.

In another factory-manufactured approach, preselected optical fibers are accessed, severed and prepared "splice-ready" at the mid-span access location for splicing to optical fibers of one or more drop cables in the field following installation of the distribution cable. The mid-span access location in this approach is encapsulated with a protective structure (e.g., closure) for cable reeling, shipping, cable unreeling and installation that is removed and discarded to gain access to the splice-ready optical fibers following installation of the distribution cable. The optical fibers of the drop cables are then spliced to the splice-ready optical fibers at the mid-span access location and a protective splice closure is added around the mid-span access location to protect the optical splices and the exposed section of the distribution cable. There are several advantages to splicing the drop cables to the distribution cable in the field following installation of the distribution cable. First, the drop cables can be added only when needed in order to defer labor and material costs. Second, drop cables of customized length can be used to mitigate improper location of the mid-span access location due to span length measurement differences. However, there are disadvantages as well. While terminating and preparing splice-ready optical fibers in the factory significantly reduces the amount of labor required to connect subscribers to a mid-span access location, it is still necessary to splice the optical fibers of the distribution cable to the optical fibers of the drop cables in the field, oftentimes at an inconvenient location or under less than ideal working conditions. Another disadvantage is that a relatively expensive splice closure must be added to the distribution cable assembly at the mid-span access location in the field to protect the optical splices and the exposed section of the distribution cable, thereby increasing installation complexity as well as labor and material costs. In contrast, a pre-connectorized fiber optic distribution cable having a predetermined mid-span access location that provides access to the connectorized optical fibers allows a field technician to readily interconnect a tether having a customized length to the distribution cable following installation only when needed and without the addition of a relatively expensive splice closure.

Accordingly, it would be desirable to provide a factory-assembled fiber optic distribution cable for accessing one or more preterminated and pre-connectorized optical fibers at a mid-span access location having an outer diameter that is only minimally larger than the outer diameter of the distribution cable. It would also be desirable to provide a pre-connectorized fiber optic distribution cable having one or more low profile mid-span access locations that is suitable for both buried installations (e.g., through small-diameter conduit) and aerial installations (e.g., over sheave wheels and pulleys). It would also be desirable to provide a pre-connectorized fiber optic distribution cable that allows a field technician to readily interconnect a tether having a customized length to the distribution cable following installation to mitigate improper location of the mid-span access location due to span length measurement differences. It would further be desirable to provide a pre-connectorized fiber optic distribution cable that allows a field technician to readily interconnect a tether having a customized length to the distribution cable following installation only as the mid-span access location is needed to provide service to subscribers without the addition of a relatively expensive splice closure.

BRIEF SUMMARY OF THE INVENTION

To achieve the foregoing and other objects, and in accordance with the purposes of the invention as embodied and broadly described herein, the present invention provides various embodiments of a factory-assembled pre-connectorized fiber optic distribution cable having at least one predetermined mid-span access location along the length of the cable for providing access to at least one, and preferably a plurality of, preterminated optical fibers. Each such mid-span access location is fully protected during cable reeling and unreeling, during the installation process, and until needed by an injection molded encapsulating shell, also referred to herein as an "overmolded" shell. The pre-connectorized fiber optic distribution cable is configured to have a low profile (i.e., small outer diameter) and relative flexibility for installation through a small-diameter conduit system or around aerial installation sheave wheels and pulleys. Each mid-span access location provides access to one or more preterminated and pre-connectorized optical fibers for interconnecting at least one pre-connectorized drop cable to the distribution cable. In preferred embodiments, each mid-span access location provides access to a plurality of optical fibers terminating in a multi-fiber ferrule, such as a mechanically transferable (MT) ferrule, for interconnection with a pre-connectorized tether having a customized length.

In the various exemplary embodiments described herein, the present invention comprises a fiber optic distribution cable having at least one predetermined mid-span access location at which a plurality of optical fibers accessed from the distribution cable are terminated and pre-connectorized (i.e., connectorized in the factory) with a multi-fiber ferrule operable for receiving a connectorized drop cable or branch cable, and in particular, a tether. Although the drawing figures depict only a single mid-span access location, it is envisioned that any number of factory-prepared access locations may be provided on a distribution cable to accommodate a customized distribution and termination solution for a pre-engineered fiber optic communications network. At each mid-span access location, a plurality of optical fibers are terminated and furcated from the remaining optical fibers of the distribution cable. The preterminated optical fibers are connectorized and encapsulated within a protective overmolded shell to be subsequently optically connected to respective optical fibers of one or more fiber optic drop cables or fiber optic branch cables. The optical fibers of the drop cables or branch cables preferably are likewise connectorized so that the distribution cable and the drop cables or branch cables provide a true plug-and-play type interconnection system, thereby enabling a less experienced and less skilled field technician to readily install the fiber optic communications network. The drop cables may be used to connect an optical fiber of the distribution cable to a subscriber premises, thereby extending an all-optical communications network entirely to the subscriber premises. The branch cable may be used to connect the preterminated optical fibers of the distribution cable to another distribution point, such as a network optical connection terminal. In the exemplary embodiments shown and described herein, the fiber optic drop cable or branch cable is a tether having a customized length terminating in an array of optical connection nodes, such as a multi-port connection terminal. As used hereinafter in the description of the exemplary embodiments, the terms "fiber optic drop cable" and "drop cable" should be understood to include any fiber optic cable, monotube, tether or like conduit for routing and protecting at least one optical fiber, including a fiber optic branch cable or secondary distribution cable.

In one embodiment, the present invention provides a pre-connectorized fiber optic distribution cable assembly comprising a distribution cable having a plurality of optical fibers and at least one mid-span access location positioned along the length of the distribution cable. At least one optical fiber of the distribution cable is accessed and terminated from the distribution cable at the mid-span access location. The assembly further comprises at least one optical connector mounted upon the end of the accessed and terminated optical fiber, a receptacle for receiving the optical connector and providing access to the optical connector without entering the mid-span access location, and a protective overmolded shell formed from a relatively flexible material encapsulating the mid-span access location and securing the receptacle within the shell. The assembly may further comprise a tether having a customized length that is pre-connectorized and interconnected in the field with the optical connector disposed within the receptacle. The tether is operable for mitigating errors in the actual location of the mid-span access along the length of the installed distribution cable, and in particular, span length measurement differences in a pre-engineered fiber optic communications network.

In another embodiment, the present invention provides a fiber optic distribution cable assembly comprising a plurality of optical fibers and one or more factory-assembled mid-span access locations along the length of the distribution cable. The plurality of optical fibers are accessed and terminated from the distribution cable at each mid-span access location and connectorized with a multi-fiber ferrule. The assembly further comprises a receptacle for receiving and aligning the multi-fiber ferrule with an opposed multi-fiber ferrule mounted upon the end of a fiber optic cable, and a protective overmolded shell formed from a relatively flexible material encapsulating the mid-span access location and securing the receptacle within the shell. The multi-fiber ferrule of the distribution cable is interconnected with the multi-fiber ferrule mounted upon the end of the cable in the field without entering the mid-span access location. Preferably, the fiber optic cable is a tether having a customized length that is interconnected in the field with the distribution cable to compensate for errors in the actual location of the mid-span access along the length of the installed distribution cable, and in particular, span length measurement differences in a pre-engineered fiber optic communications network.

In a farther embodiment, the present invention provides a method for mitigating a span length measurement difference in a pre-engineered fiber optic communications network employing a fiber optic distribution cable assembly comprising a distribution cable having a plurality of optical fibers disposed within a sheath and at least one mid-span access location. The method comprises removing a section of the sheath of the distribution cable at the mid-span access location, accessing at least one of the plurality of optical fibers of the distribution cable within the sheath of the distribution cable, terminating the at least one optical fiber accessed from within the removed section of the sheath, connectorizing the at least one optical fiber, overmolding the mid-span access location such that the connectorized optical fiber is accessible for subsequent interconnection with a connectorized optical fiber mounted on a first end of a tether, installing the distribution cable assembly in the pre-engineered fiber optic communications network, optically connecting the connectorized first end of the tether to the connectorized optical fiber of the distribution cable at the mid-span access location, and positioning a second end of the tether opposite the first end at a desired location to compensate for the span length measurement difference.

In a still further embodiment, the present invention provides a pre-connectorized fiber optic distribution cable for use in a pre-engineered optical communications network. The pre-connectorized distribution cable comprises a plurality of predetermined mid-span access locations along the length of the distribution cable that provide access to at least one terminated and pre-connectorized optical fiber disposed within a receptacle through a low-profile, relatively flexible overmolded shell that encapsulates the mid-span access location and the receptacle. The pre-connectorized distribution cable may be readily deployed in the pre-engineered optical communications network in a factory-assembled configuration to be interconnected with at least one fiber optic drop cable leading to a subscriber premises, or with a fiber optic branch cable or tether leading to a network optical connection terminal.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
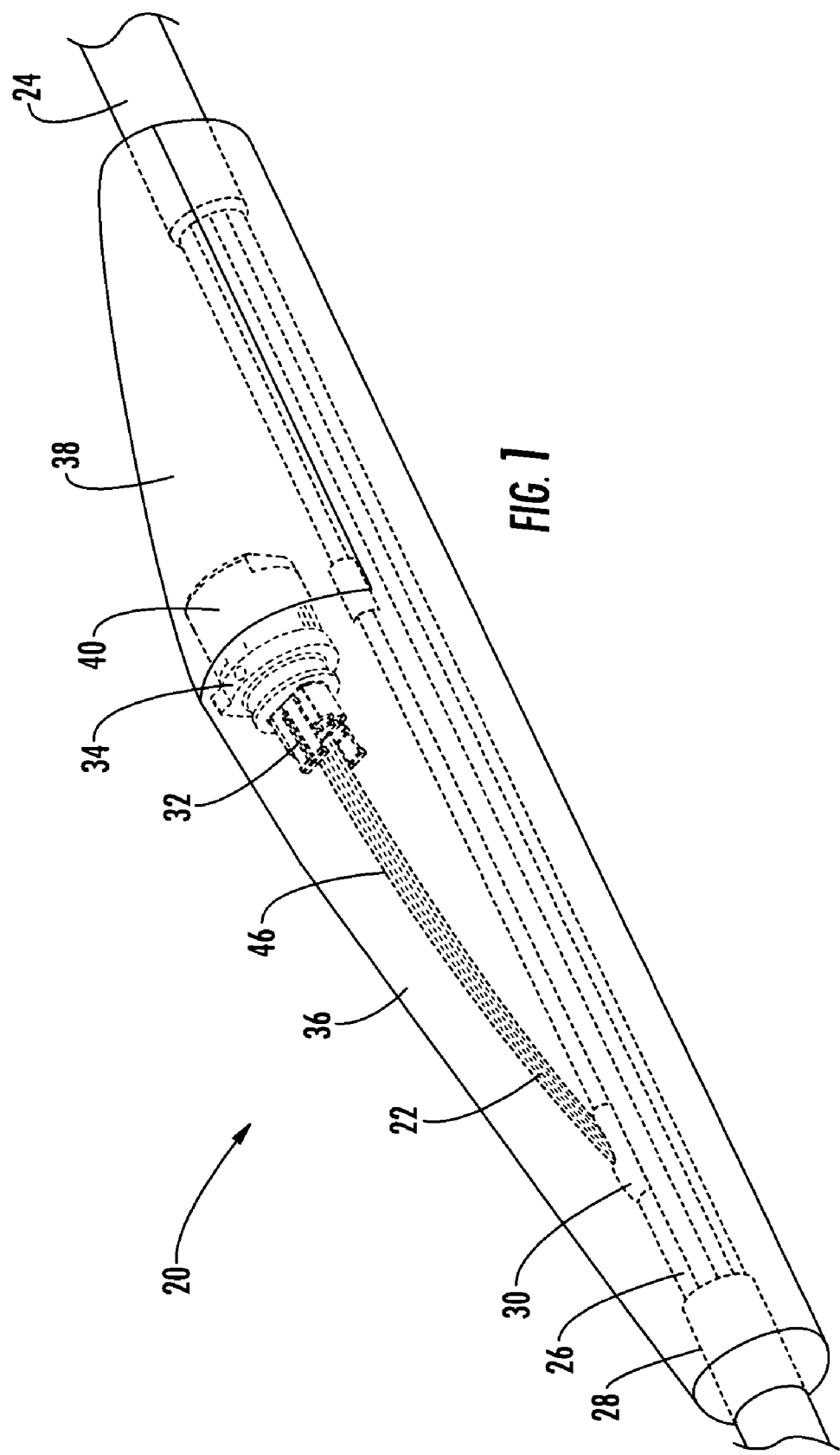
FIG. 1 is a perspective view of a pre-connectorized fiber optic distribution cable assembly comprising a mid-span access location and a protective overmolded shell in accordance with an exemplary embodiment of the present invention shown with a connector access cover attached to the overmolded shell.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, will fully convey the scope of the invention to those skilled in the art, and will enable one of ordinary skill in the art to make, use and practice the invention without undue experimentation. Like reference numbers refer to like elements throughout the various drawings.

The pre-connectorized fiber optic distribution cable of the present invention comprises at least one mid-span access location along the length of the distribution cable having a protective overmolded shell for providing access to at least one pre-connectorized optical fiber terminating in a multi-fiber ferrule. In preferred embodiments, the pre-connectorized distribution cable comprises a plurality of predetermined mid-span access locations spaced apart along the length of the distribution cable, thereby providing multiple interconnection points, also referred to herein as "tap points," for subsequently interconnecting a connectorized fiber optic drop cable, branch cable or tether to the distribution cable in the field. The low-profile and relative flexibility of the overmolded shell permit the distribution cable assembly to be wound upon a reel, unreeled and installed through small diameter conduits and over sheave wheels and pulleys in buried and aerial deployments. The pre-connectorized distribution cable is manufactured and assembled in a factory, thus eliminating the need for first installing the distribution cable and then performing a mid-span access and optical splicing in the field. The distribution cable assembly of the present invention offers a provider of communication services factory-prepared and pre-connectorized mid-span access locations having an outer diameter that is only minimally larger than the outer diameter of the distribution cable. Once the distribution cable is installed, a connector access cover is removed as needed to provide access to at least one optical connector, and in preferred embodiments a multi-fiber ferrule, for interconnecting a connectorized fiber optic drop cable branch cable or tether.

The distribution cable assembly of the present invention overcomes the difficulties encountered when installing a conventional distribution cable having a plurality of mid-span access locations at predetermined locations spaced along the length of the distribution cable. The distribution cable assemblies described below minimize field labor and material costs and achieve high accuracy tap point locations by utilizing a tether having a customized length that mitigates span length measurement differences. In use, a distribution cable assembly in accordance with the invention is installed such that the factory-assembled mid-span access location is positioned short (i.e., upstream) of a telephone pole, hand hole or network optical connection terminal, such as a pedestal or other termination enclosure. Once the distribution cable assembly is installed, the installer can measure exactly what length of drop cable or tether is needed to extend the mid-span access location to the desired tap point location. A connectorized drop cable or tether having a predetermined length, or more preferably a customized length, is used to compensate for the span length measurement difference between the actual location of the mid-span access and the desired location of the tap point. The overmolded shell seals the mid-span access location and the connectorized optical fibers, while permitting the connectorized drop cable or tether to be optically connected to the distribution cable without the need to enter a complex and relatively expensive splice enclosure. Furthermore, the connectorized drop cable or tether can be optically connected to the distribution cable only as needed to provide service to subscribers of the communications service, thereby deferring the additional labor and material costs of interconnecting the distribution cable with a network optical connection terminal.

Throughout the specification, the term "distribution cable" is intended to include all types of fiber optic cables comprising a plurality of optical fibers within a cable jacket including, but not limited to, loose tube, monotube, central tube, tight buffered, ribbon, armored, and the like. In the exemplary embodiments shown and described herein, the distribution cable comprises a cable sheath, one or more buffer tubes, an optical transmission component and a strength component. The distribution cables described and shown herein comprise a plurality of buffer tubes containing ribbonized optical fibers (also referred to as optical fiber ribbons) for exemplary purposes only. The distribution cable may also comprise one or more buffer tubes containing individual optical fibers that may be ribbonized prior to terminating the optical fibers in a multi-fiber connector. Typically, optical fiber ribbons consist of multiple optical fibers (for example six, eight or twelve) that are bound together in a resin material to form a flat ribbon. The optical fiber count available at each mid-span access location may vary from 1 up to at least 72 fibers using existing multi-fiber ferrules. It is anticipated, however, that most mid-span access locations will provide access to between 4 and 12 optical fibers. In various embodiments, the optical fibers may be color-coded for easy identification. It is understood that the optical fibers may be either single mode or multi-mode and that the optical fibers, ribbonized or not, may terminate in one or more connectors. Preferably, however, the optical fibers terminate in a single multi-fiber ferrule, such as a Mechanically Transferable (MT) style ferrule. In an alternative embodiment, the terminated optical fibers may be fanned out and connectorized with a plurality of single fiber connectors. It is understood that other cable types may be used in conjunction with the present invention. The distribution cable is preferably designed to provide stable performance over a wide range of temperatures and to be compatible with any telecommunications grade optical fiber.

In the exemplary embodiments shown and described herein, the multi-fiber connector shown is a generic MT ferrule, however, other multi-fiber ferrules such as MTP, MPO and MT-RJ may be used without departing from the scope of the invention. The MT ferrule is mounted upon the ends of the terminated optical fibers accessed from a predetermined mid-span access location along the length of the distribution cable. The MT connector provides a semi-permanent connection between the terminated optical fibers and optical fibers associated with a closure or drop cable(s). If necessary, the MT connector may be connected and disconnected in new configurations as desired. By providing a connector, as opposed to splicing optical fibers at a mid-span access location, miscalculations in the placement of the access location along the cable length may be adjusted by connecting connectorized drop cables or tethers having predetermined or customized lengths to the connector. If it is desired to later increase the length of a drop cable or tether, or to interconnect the distribution cable with something other than a drop cable or tether, the existing drop cable or tether can be disconnected and replaced without having to perform field optical fiber splicing at the mid-span access location.

Referring now to FIG. 1, the pre-connectorized fiber optic distribution cable assembly of the present invention includes at least one, and preferably a plurality of, predetermined mid-span access locations 20 along the length of the distribution cable 24. The mid-span access locations 20 are "predetermined" because the distribution cable is typically deployed in a pre-engineered optical communications network wherein the positions of the mid-span access locations along the length of the distribution cable are selected to be short (i.e., upstream) of the telephone pole, hand hole or network optical connection terminal (e.g., pedestal or other optical connection enclosure) at which the network designer desires the tap points to be located. As a result, the location of the accessed, terminated and connectorized optical fibers 22 can be extended from the actual mid-span access location to the desired location of the tap points to compensate for span length measurement differences that result from network measurement miscalculations, installation errors, and differences between the proposed locations and the actual locations of the corresponding telephone poles, hand holes and network optical connection terminals. In the exemplary embodiment shown, optical fibers 22 of the distribution cable 24 in the form of an optical fiber ribbon are accessed and terminated at one of the predetermined mid-span access locations 20 along the length of the fiber optic distribution cable 24. In the embodiment shown, the fiber optic distribution cable 24 comprises a plurality of buffer tubes 26 disposed within a cable jacket or sheath 28. The terminated optical fibers 22 are routed out of their respective buffer tube 26 via a buffer tube transition piece 30 at a convenient furcation point. The optical fibers 22 may be accessed, terminated (i.e., severed), transitioned and furcated in any suitable manner know to those of ordinary skill in the art, for example, in the manner described and shown in co-pending U.S. patent application Ser. No. 10/724,244, which is assigned to the assignee of the present invention. Regardless, the optical fibers 22 terminate in a multi-fiber connector, and in particular to a multi-fiber ferrule 32, that is mounted upon the ends of the optical fibers 22. As is well known in the art, the optical fibers 22 may be direct-connectorized to the ferrule 32, or the optical fibers 22 may be mechanically or thermally (e.g., fusion) spliced to a short length of connectorized optical fibers commonly referred to in the art as a pigtail. The ferrule 32 is received or disposed within a robust receptacle 34, such as the connector receptacle shown and described in U.S. Pat. No. 6,579,014, issued Jun. 17, 2003 and entitled "*Fiber Optic Receptacle*," and U.S. patent application Ser. No. 10/924,525, filed Aug. 24, 2004 and entitled "*Fiber Optic Receptacle and Plug Assemblies*," which are both assigned to the assignee of the present invention. A protective shell 36 is injection molded around the mid-span access location 20, a suitable length of the sheath 28 of the distribution cable 24 at each end of the mid-span access location, and the receptacle 34 containing the ferrule 32. The shell 36 may be injection molded in any suitable manner, for example using a two-piece clamshell molding tool with the mid-span access location 20, the ends of the sheath 28 and the receptacle 34 suspended therebetween, and is referred to herein as being "overmolded" around the distribution cable 24 at the mid-span access location 20. The protective overmolded shell 36 is relatively flexible so that the distribution cable can be readily installed through small-diameter conduit for buried deployments and over sheave wheels and pulleys for aerial deployments. The overmolded shell 36 provides physical and environmental protection to the mid-span access location 20, including the exposed section of the distribution cable 24, the terminated optical fibers 22 and the ferrule 32, as well as sealing the ends of the sheath and the receptacle 34.

Figure 2:
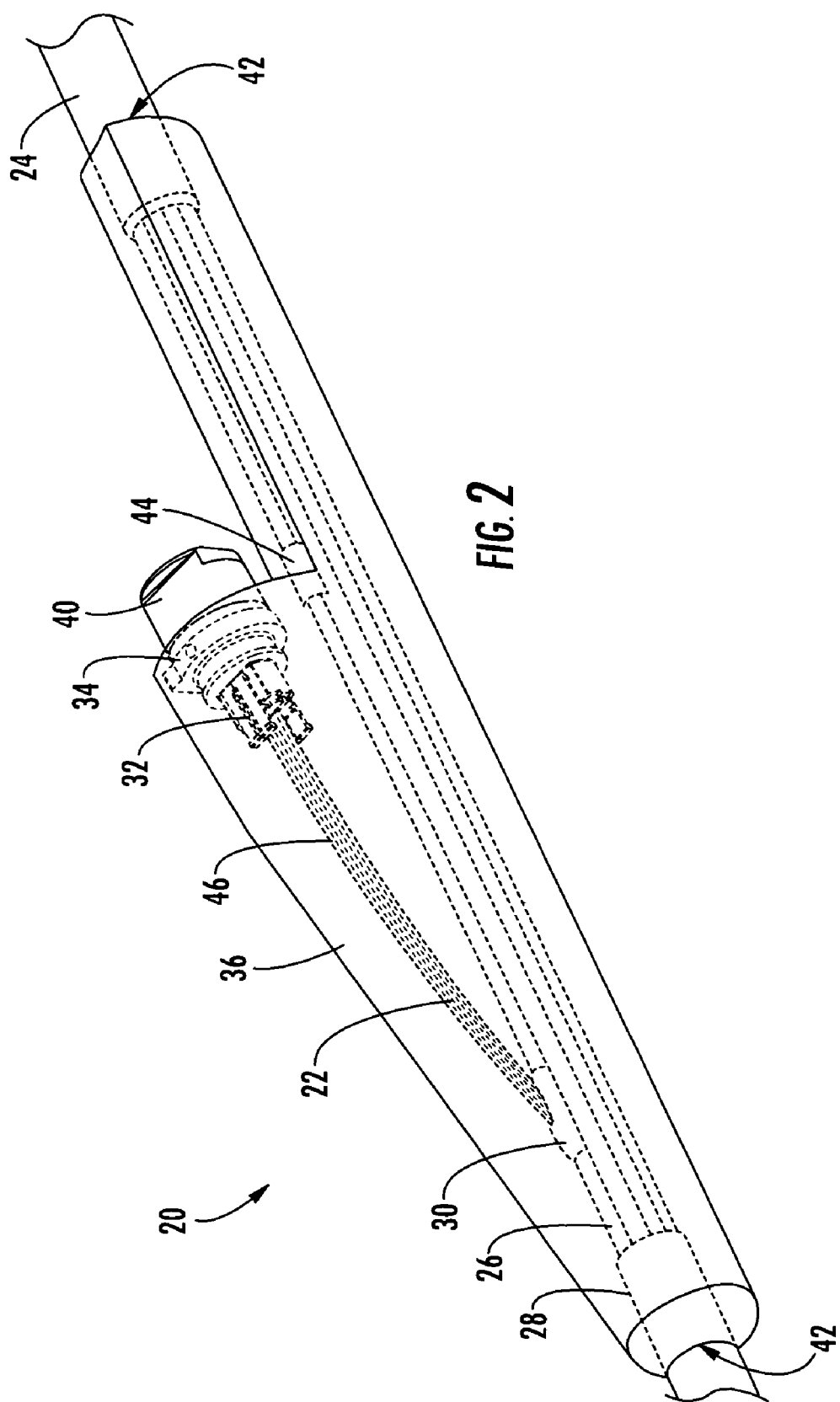
FIG. 2 is a perspective view of the pre-connectorized fiber optic distribution cable assembly of FIG. 1 shown with the connector access cover removed.

Still referring to FIG. 1, the overmolded shell 36 is shaped and designed such that a cover 38 is removable following installation of the distribution cable assembly in order to expose the receptacle 34 and thereby provide access to the ferrule 32. A receptacle cap 40 may be fastened, for example threaded, onto the receptacle 34 underneath the protective cover 38 in order to protect the ferrule 32 and prevent contaminants from entering the receptacle 34. The protective cover 38 is secured to the overmolded shell 36 during installation and removed only when the mid-span access location 20 is needed to interconnect a fiber optic drop cable or tether. In an alternative embodiment, the overmolded shell 36 and receptacle cap 40 are sufficient to protect the receptacle 34 and ferrule 32 during handling, shipping and installation, and therefore, the protective cover 38 is not needed. Thus, the overmolded shell 36 may be designed without features for receiving or securing a cover 38. Referring to FIG. 2 wherein the mid-span access location 20 is shown with the protective cover 38 removed, the ferrule 32, such as the multi-fiber MT ferrule shown, is optically connected in a known manner to a multi-fiber ferrule of a fiber optic drop cable (including a branch cable or secondary cable) or tether, as will be described further hereinafter. With the protective cover 38 removed, the mid-span access location 20, and in particular the exposed section of the distribution cable 24, remain encapsulated by the overmolded shell 36. In all embodiments, the overmolded shell 36 covers a relatively short length of the opposed ends of the sheath 28 adjacent the mid-span access location 20. In preferred embodiments, the overmolded shell 36 covers at least about 1 inch of each end of the sheath 28 in order to prevent the ingress of water along the distribution cable 24. In certain instances in which the distribution cable 24 and the mid-span access location 20 are flexed (for example during reeling or installation), the ends of the overmolded shell 36 may separate slightly from the cable sheath 28 along contact areas 42, thereby forming a slight void for water to enter. However, overmolding the shell 36 around the cable sheath 28 for a distance greater than about 3 inches will ensure that water does not penetrate to the exposed section of the distribution cable 24. Although not shown, water-blocking clamps may be secured around the distribution cable 24 if desired to further prevent water ingress. The water-blocking clamps may also function as bonding surfaces to further secure the overmolded shell 36 in position.

Typically, the length of the mid-span access location 20 and the overmolded shell 36 ranges from about 12 to 36 inches. In embodiments in which the terminated optical fibers 22 are direct connectorized, the exposed section of the distribution cable 24 has a length sufficient to access about 12 to 24 inches of optical fiber from the distribution cable 24 for direct connectorization, and if necessary, re-connectorization to the ferrule 32. In embodiments in which the terminated optical fibers 22 are spliced to a length of optical fiber comprising a ferrule mounted upon one of its ends (i.e., a "pigtail"), the mid span access location 20 may have a length up to about 36 inches. The flexibility of the overmolded shell 36 may vary as a result of its length and the physical properties of the injection molding material(s) utilized.

Referring still to FIGS. 1 and 2, each mid-span access location 20 is created by removing a section of the cable sheath 28 to access the appropriate buffer tube 26 at two or more locations. In the exemplary embodiment shown, the fiber optic distribution cable 24 includes at least one buffer tube 26 disposed within the cable sheath 28. As is known by those skilled in the art, the distribution cable 24 as shown and described herein may include any known fiber optic cable having a fiber count greater than that of a drop cable and comprising at least one tubular body for containing the optical fibers 22 to be terminated at the mid-span access location 20. In various embodiments, the distribution cable 24 includes a water-blocking compound, such as a gel, to prevent water penetration into the buffer tubes 26. However, the distribution cable 24 may also be a "dry-tube" cable. Each buffer tube 26 may include any number of individual optical fibers or ribbonized optical fibers, for example, ribbons of four, six, eight and twelve optical fibers may be used.

To create a low-profile, mid-span access location 20 capable of being installed through relatively small diameter conduit (e.g., about 2 inch diameter) and over sheave wheels and pulleys, a section of the cable sheath 28 is severed and removed to expose the underlying buffer tubes 26. The exposed length of the buffer tubes 26 may vary according to the length of the optical fibers needed to direct-connectorize, mechanically splice, fusion splice or otherwise optically connect the terminated optical fibers 22 to the ferrule 32. However, in a preferred embodiment the length of the terminated optical fibers 22 ranges between about 10 and about 30 inches. In a more preferred embodiment, the length ranges between about 14 and about 20 inches. Accordingly, the exposed length of the buffer tube 26 allows for about 10 to about 30 inches of ribbon optical fiber to be withdrawn from the buffer tube 26 for connectorization, as well as providing sufficient slack fiber length for subsequent repair or re-connectorization if necessary. The cable sheath 28 may be removed by completely or partially ring-cutting the sheath 28 at spaced-apart locations and slitting the sheath 28 in a manner well known in the art without damaging the underlying buffer tubes 26.

In the exemplary embodiment shown in FIGS. 1 and 2, two short sections of the appropriate buffer tube 26 are removed at each mid-span access location 20. A downstream section 44 is formed by ring-cutting the buffer tube 26 and completely removing about a 1 to 5 inch section of the buffer tube 26 between the ring cuts. The appropriate underlying optical fibers 22 are then severed. As shown, the optical fibers 22 are ribbonized for convenience. However, the optical fibers 22 may be individual optical fibers that are ribbonized prior to connectorization to the ferrule 32, or may be individual optical fibers that are inserted into the fiber bores of the ferrule 32 in a known manner. Another ring cut is then made at a second section of the buffer tube 26 about 9 to 12 inches upstream of the downstream section 44. The upstream section, which is obscured in FIGS. 1 and 2 by buffer tube transition piece 30, may be formed by making one ring cut and sliding the portion of the buffer tube 26 between the two sections downstream until it rests against the end of the buffer tube 26 created by the first ring cut. The upstream section may also be formed by ring-cutting the buffer tube 26 in two places and removing about 1 to about 5 inches of the buffer tube 26 at the upstream section. In another embodiment, the buffer tube 26 may be accessed in two places using a standard No-Slack Optical Fiber Access Tool (NOFAT) available from Corning Cable Systems LLC of Hickory, N.C. The NOFAT tool is suitable for use in locations in which a minimal amount of cable slack can be obtained and the buffer tubes 26 remain wrapped (e.g., spiral-wrapped) around a central member. The NOFAT tool provides a guide that allows a scalpel to slice open a section of a buffer tube 26 without damaging the underlying optical fibers. The NOFAT tool is compatible with standard Corning Cable Systems buffer tube sizes. In any access method employed, the purpose is to remove portions of the buffer tube 26 so that one or more optical fibers 22 may be identified and severed at a downstream location and fished out of an upstream location to provide a predetermined length of the optical fibers 22 for connectorization to ferrule 32.

In an alternative embodiment, the appropriate buffer tube 26 may be accessed at three or more locations, typically about 10-15 inches apart. As will be readily understood by those skilled in the art, three or more access locations are specifically advantageous for withdrawing longer lengths of optical fiber from a buffer tube filled with a water-blocking gel. Once the access locations have been formed, the appropriate optical fibers 22 are identified and severed at the furthest downstream buffer tube access point. The severed optical fibers 22 are then fished out of the same buffer tube 26 at the next upstream access point, thereby exposing about 12 to about 14 inches of fiber length. The severed optical fibers 22 are then fished out of the same buffer tube 26 at the next upstream access point, thereby exposing a total of about 20 to about 30 inches of fiber length. The process may be repeated, without violating the minimum bend radius of the optical fibers, until the desired length of the optical fibers 22 is removed from the buffer tube 26 and available for connectorization. After removing the optical fibers 22 from the buffer tube 26, any water-blocking gel (if present) is cleaned from the optical fibers, for example using an alcohol-based solvent.

Once the optical fibers 22 have been withdrawn from the corresponding buffer tube 26, the optical fiber ribbon (as shown herein) is fed through an opening formed in the buffer tube transition piece 30. The buffer tube transition piece 30 is preferably made of rubber, soft plastic or other relatively flexible material to permit the buffer tube transition piece 30 to be attached and conform to the curvature of the buffer tube 26. The buffer tube transition piece 30 is positioned to surround and thereby protect the exposed upstream access point of the buffer tube 26. In a preferred embodiment, the buffer tube transition piece 30 is C-shaped and installed over the exposed upstream access point where the optical fiber ribbon exits the buffer tube 26. The buffer tube transition piece 30 defines an optical fiber opening operable for retaining and aligning the optical fibers 22. Once the optical fiber ribbon has been routed from the buffer tube 26 to the ferrule 32, the buffer tube transition piece 30 may be filled with a sealing material, such as a silicone elastomer or epoxy material, to prevent any injection molding material from entering the buffer tube 26 at the upstream section, to resist torque in the transition piece 30, and to prevent any water-blocking gel that may be present from leaking out of the buffer tube 26. The downstream access location 44 may likewise be covered, for example with foil or tape, to prevent any water-blocking gel that may be present from leaking out of the buffer tube 26 and to prevent any injection molding material from entering the buffer tube 26.

The terminated optical fibers 22 shown routed through the buffer tube transition piece 30 may be inserted into a protective tube 46 consisting of an outer jacket, Kevlar and an inner tube. The protective tube 46 may be inserted into the opening formed through the buffer tube transition piece 30 and bonded with epoxy. The opening should be positioned downstream of the origination of the optical fibers so that the optical fibers are smoothly transitioned without violating their minimum bend radius. The severed ends of the optical fibers 22 are dressed and then terminated with the multi-fiber ferrule 32, for example by direct-connectorization, and polished if necessary.

Referring again to FIG. 1, the pre-connectorized distribution cable assembly is shown with a typical mid-span access location 20 fully assembled and ready to be installed. The protective overmolded shell 36 is operable for sealing and protecting the mid-span access location 20, the pre-connectorized optical fibers 22 and the receptacle 34 during shipping, handling and installation until the mid-span access location 20, and in particular the receptacle 34, is needed to interconnect a drop cable or tether with the distribution cable 24 to provide communications service to a subscriber. In an alternative embodiment, at least one ripcord (not shown) may extend a predetermined distance beyond each end of the overmolded shell 36. The ripcord is operable for removing the protective overmolded shell 36 after cable installation if necessary to repair (e.g., re-connectorize) the optical fibers or replace the ferrule 32 or receptacle 34. An over-molding wrap (not shown), for example foil, tape, shrink-wrap or water-blocking material may be disposed immediately beneath the overmolded shell 36 prior to overmolding to provide a penetration barrier for the molding material. As previously mentioned, the mid-span access location 20 is overmolded by clamping or otherwise securing a mold tool around the distribution cable 24 at the mid-span access location 20 that defines one or more cavities into which the molding material can flow. The tool comprises a plurality of injection ports for injecting the molding material. The molding material may include, but is not limited to, any polymeric material that may be injected in a liquid form, will flow into any void defined between the mold tool and the distribution cable 24, and will cure to form a substantially hardened protective shell, for example a two-part polyurethane or thermoplastic material. The molding material bonds to the over-molding wrap (if present) and to a suitable length of the cable sheath 28 adjacent each end of the mid-span access location 20, as previously described.

Figure 3:
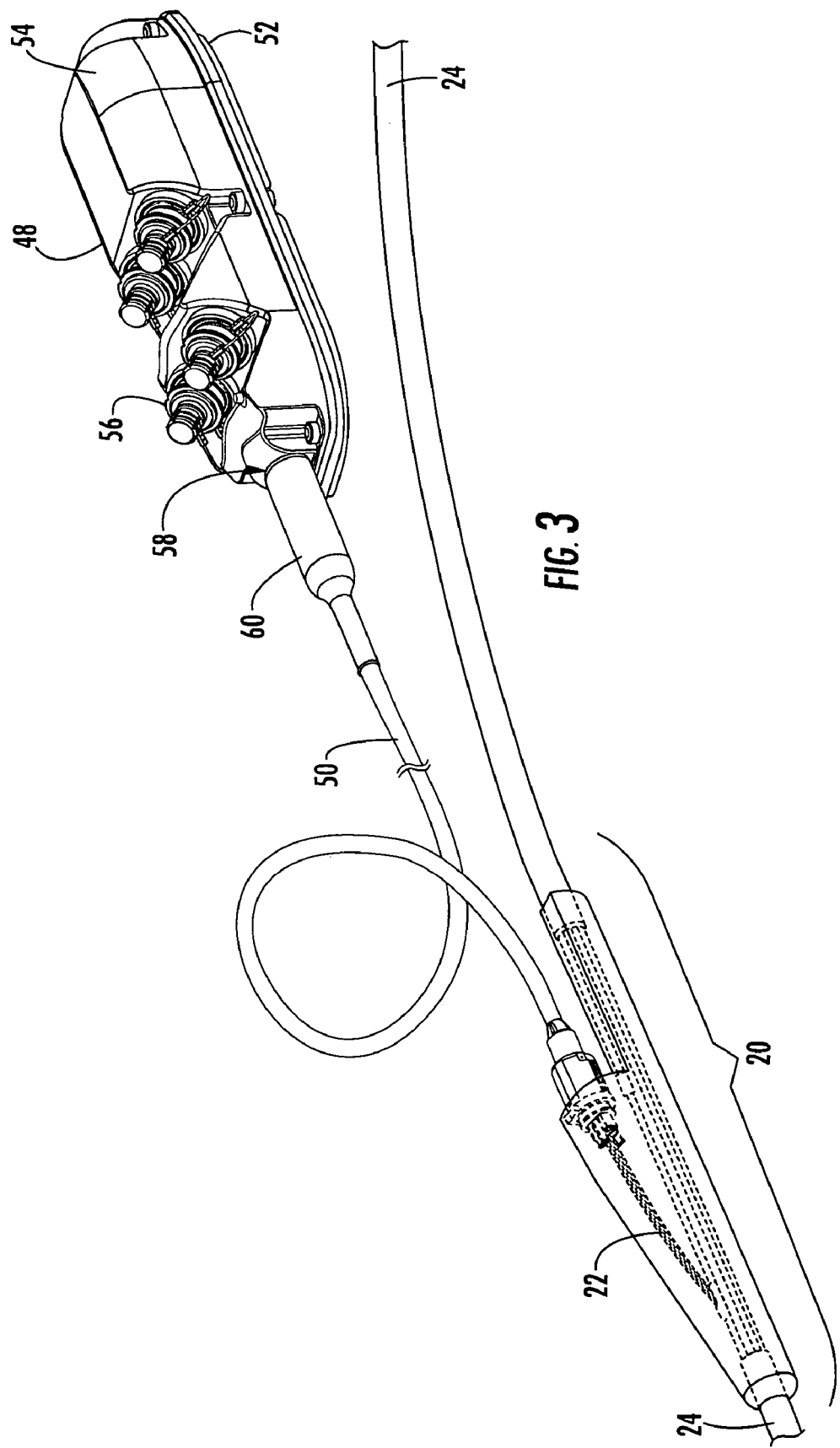
FIG. 3 is a perspective view of the pre-connectorized fiber optic distribution cable assembly of FIG. 2 shown with a tether having a first end optically connected to the distribution cable and a second end terminating in a first embodiment of a multi-port connection terminal.

Referring now to FIG. 3, the distribution cable assembly having a mid-span access location 20 is shown with a first embodiment of a multi-port connection terminal 48 optically connected to the distribution cable 24 through the receptacle 34. The mid-span access location 20 provides a means for optically connecting one or more optical fibers contained within a tether 50 to the one or more terminated optical fibers 22 of the fiber optic distribution cable 24. As used herein, the term "tether" is intended to include any fiber optic cable or tubular body having one or more optical fibers contained within the tubular body. The remaining optical fibers of the distribution cable 24 are managed and routed separately from the terminated optical fibers 22 such that they extend uninterrupted through the distribution cable 24 and are available for terminating at other downstream mid-span access locations 20. The tether 50 may have a predetermined length ranging from several feet to several thousand feet that is sufficient to route the multi-port connection terminal 48 to any desired location in the optical communications network downstream or upstream of the mid-span access location 20. Alternatively, the tether 50 may be constructed with a customized length specifically designed to route the multi-port connection terminal 48 at a particular location, such as a telephone pole, hand hole or optical connection terminal (e.g., pedestal) upstream or downstream of the mid-span access location 20. In a particular example, the distance between the mid-span access location 20 and the desired location of the multi-port connection terminal 48 is measured following installation of the distribution cable 24 and the customized length of the tether 50 is selected to route and position the multi-port connection terminal 48 at the desired location without any slack length of the tether 50. As a result, management of the slack length of the tether 50 is avoided and the aesthetic appearance of the installation of the distribution cable and multi-port connection terminal 48 is improved. Importantly, the terminated and connectorized optical fibers 22 of the distribution cable 24 may be interconnected with the tether 50 at any time subsequent to the initial deployment of the distribution cable assembly, thereby deferring the initial cost of the tether 50, the multi-port connection terminal 48, and any drop cable extending to a subscriber premises. As is well known and understood in the art, the optical fibers of the tether 50 and the terminated optical fibers 22 of the distribution cable 24 may be interconnected through any known optical connector type, including a single multi-fiber connector or one or more single-fiber connectors. Thus, the distribution cable assembly provides a convenient location for interconnecting one or more optical fibers of an installed distribution cable 24 with one or more optical fibers of a tether 50, and subsequently interconnecting the optical fibers of the tether 50 with one or more optical fibers of a drop cable leading to a subscriber premises or a branch cable leading to a network optical connection terminal in a fiber optic communications network.

The multi-port connection terminal 48 provides access to one or more connectorized optical fibers optically connected to the preterminated optical fibers 22 of the distribution cable 24. As such, the multi-port connection terminal 48 may be used to readily interconnect optical fibers of one or more connectorized fiber drop cable or branch cables with the preterminated optical fibers 22 of the fiber optic distribution cable 24 at a desired location in a fiber optic communications network. In various embodiments, the multi-port connection terminal 48 may be connected to one or more drop cables or branch cables extending from a downstream location, such as a subscriber premises or an aerial, buried or above-ground network access point (e.g., aerial closure, below-grade closure or pedestal). In particular, the multi-port connection terminal 48 allows a field technician to readily connect, disconnect or reconfigure one or more drop cables extending to subscriber premises without disturbing the remaining drop cables. The multi-port connection terminal 48 may be routed separately from the distribution cable 24 to a desired location in the fiber optic communications network in order to compensate for span length measurement differences that typically result from network measurement miscalculations, installation errors, and differences between the proposed locations of telephone poles, hand holes, pedestals, etc. and their installed locations.

The multi-port connection terminal 48 in the embodiment shown in FIG. 3 comprises a base 52 and a removable cover 54, with each preferably made of a lightweight and rigid material, such as aluminum or plastic. The embodiment shown in FIG. 3 comprises four optical connection ports 56 for interconnecting the terminated optical fibers 22 of the distribution cable 24 (via the optical fibers of the tether 50) with optical fibers of drop cables or branch cables. In one embodiment, each connection port 56 is operable for receiving one or more connectorized optical fibers of the tether 50 on the inside of the connection port 56, and for receiving one or more connectorized optical fibers of a fiber optic drop cable or branch cable on the outside of the connection port 56. As used herein, the terms "optical connection port," "connection port" and "connection port" are intended to broadly include an opening through which the optical fibers of the tether 50 are optically connected to the optical fibers of a drop cable or branch cable, whether pre-connectorized, connectorized in the field (e.g., using field-installable connectors) or mechanically or fusion spliced in the field. In various embodiments, each connection port 56 may also include a factory-installed connector sleeve (not shown) for aligning and maintaining mating connectors or ferrules in opposing physical contact. Preferably, each connection port 56 further provides an environmental seal adjacent the optical interface between the optical fibers of the tether 50 and the drop cable or branch cable. Each connection port 56 may also serve to transfer any tensile load on the cables to the base 52 or the cover 54 of the multi-port connection terminal 48. While four optical connection ports 56 are shown for illustrative purposes, it is envisioned that the multi-port connection terminal 48 may have any size or shape suitable for holding any number of optical connection ports 56. In addition, the multi-port connection terminal 48 defines a cable entry port 58 for receiving the tether 50. A heat deformable material 60 may be used to provide an environmental seal and a smooth transition between the different outer diameters of the tether 50 and the cable entry port 58 of the multi-port connection terminal 48.

Figure 4:
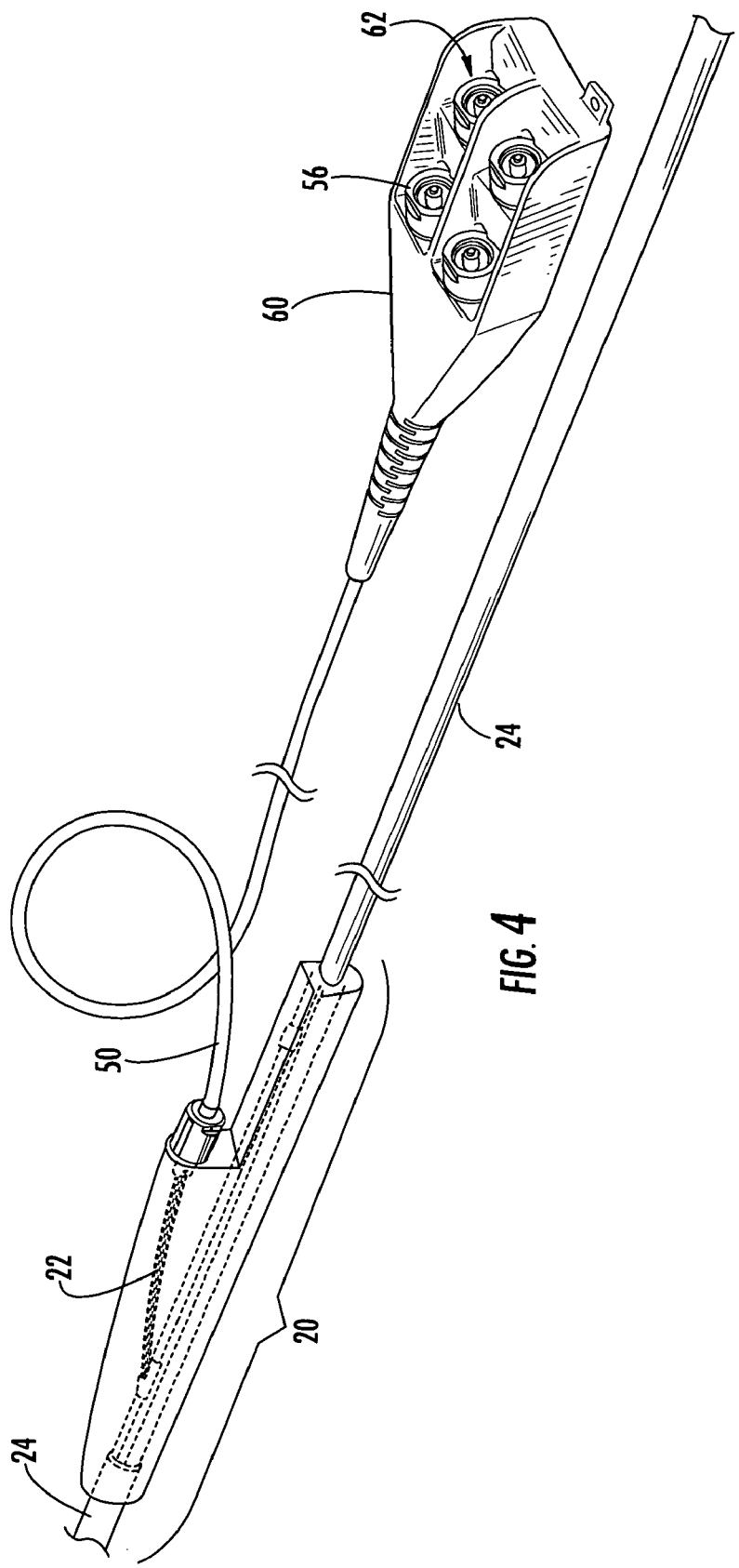
FIG. 4 is a perspective view of the pre-connectorized fiber optic distribution cable assembly of FIG. 2 shown with a tether having a first end optically connected to the distribution cable and a second end terminating in a second embodiment of a multi-port connection terminal.

Referring now to FIG. 4, a perspective view of a typical mid-span access location 20 having a tether 50 attached to the distribution cable 24 that terminates in a second embodiment of a multi-port connection terminal 60 is shown. In this embodiment, the multi-port connection terminal 60 is overmolded, thereby eliminating access to the optical fibers of the tether 50 and the optical connection ports 56 within the multi-port connection terminal 60 for repair or replacement. The overmolded multi-port connection terminal 60 includes the advantages of overmolding previously described, while still providing external access to one or more connectorized optical fibers of the tether 50 that are optically connected to the terminated optical fibers 22 of the distribution cable 24 through the ferrule 32 disposed within the receptacle 34 located at the mid-span access location 20. The overmolded multi-port connection terminal 60 may be used to readily interconnect optical fibers of one or more connectorized fiber optic drop cables or branch cables with the terminated optical fibers 22 of the distribution cable 24 at a desired location in a fiber optic communications network, as previously described. In various embodiments, the overmolded multi-port connection terminal 60 may be optically connected to one or more drop cables or branch cables extending from a downstream location, such as a subscriber premises or an aerial, buried or above-ground network access point (e.g., aerial closure, below-grade closure or pedestal). In particular, the overmolded multi-port connection terminal 60 allows a field technician to readily connect, disconnect or reconfigure one or more drop cables extending to subscriber premises without disturbing the remaining drop cables. The overmolded multi-port connection terminal 60 may be routed separately from the distribution cable 24 to a desired location in the fiber optic communications network in order to compensate for span length measurement differences that typically result from network measurement miscalculations, installation errors, and differences between the proposed locations of telephone poles, hand holes, pedestals, etc. and their installed locations.

Figure 5:
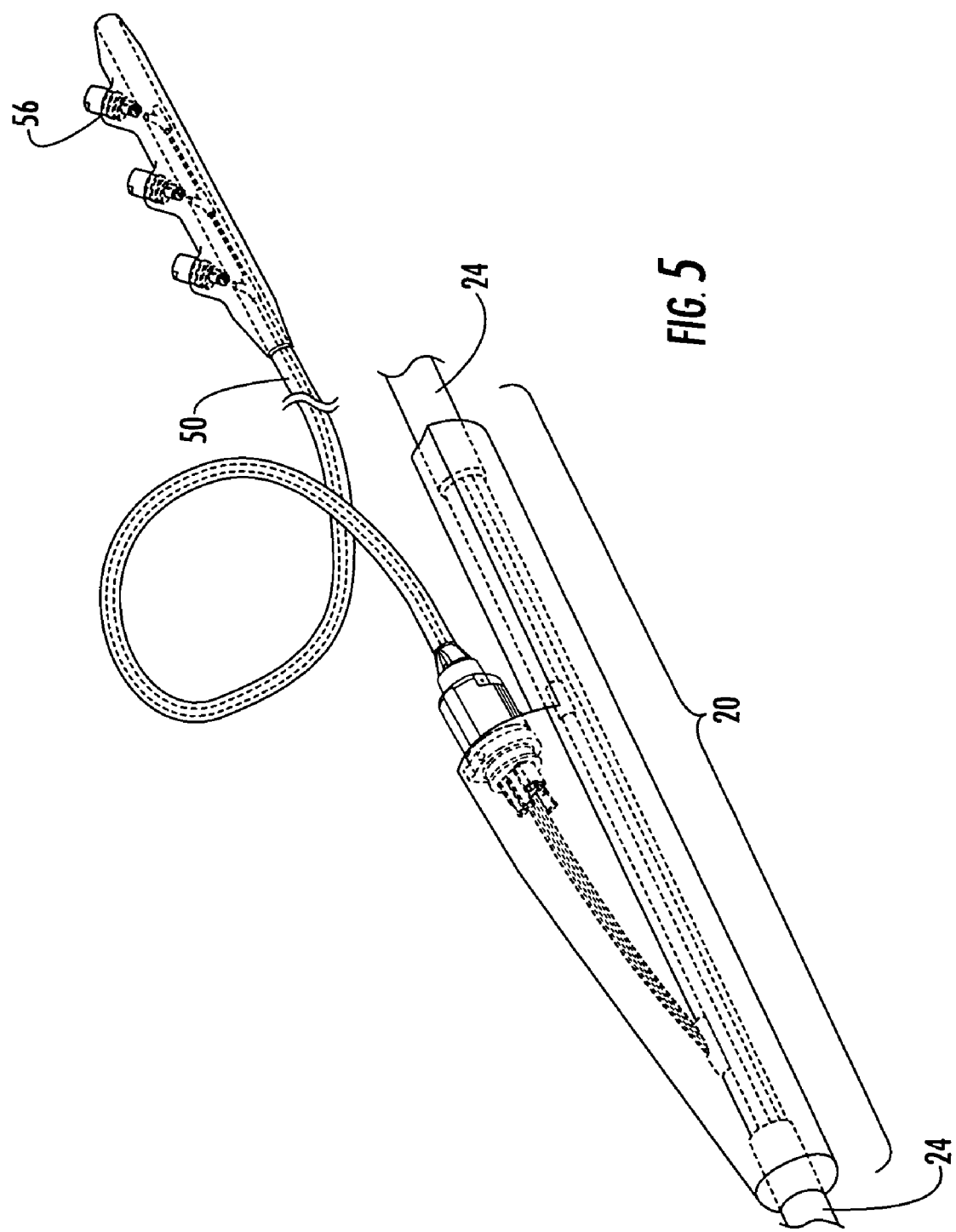
FIG. 5 is a perspective view of the pre-connectorized fiber optic distribution cable assembly of FIG. 2 shown with a tether having a first end optically connected to the distribution cable and a second end terminating in a third embodiment of a multi-port connection terminal.

As shown, the overmolded multi-port connection terminal 60 comprises four optical connection ports 56 for providing access to the connectorized optical fibers of the tether 50. However, the overmolded multi-port connection terminal 60 may have any shape and may define any number of connection ports 56, including for example, the (N×M) array of connection ports 56 shown in FIGS. 3 and 4 or the linear array of connection ports 56 shown in FIG. 5. In one embodiment, the optical fibers of the tether 50 may be connectorized and disposed within receptacles, such as adapter sleeves, retained within the connection ports 56. The overmolded structure may define recesses 62 that protect the connection ports 56, and in particular the connectors disposed within the connection ports 56, from damage caused by impact during shipping, handling and installation.

Figure 6:
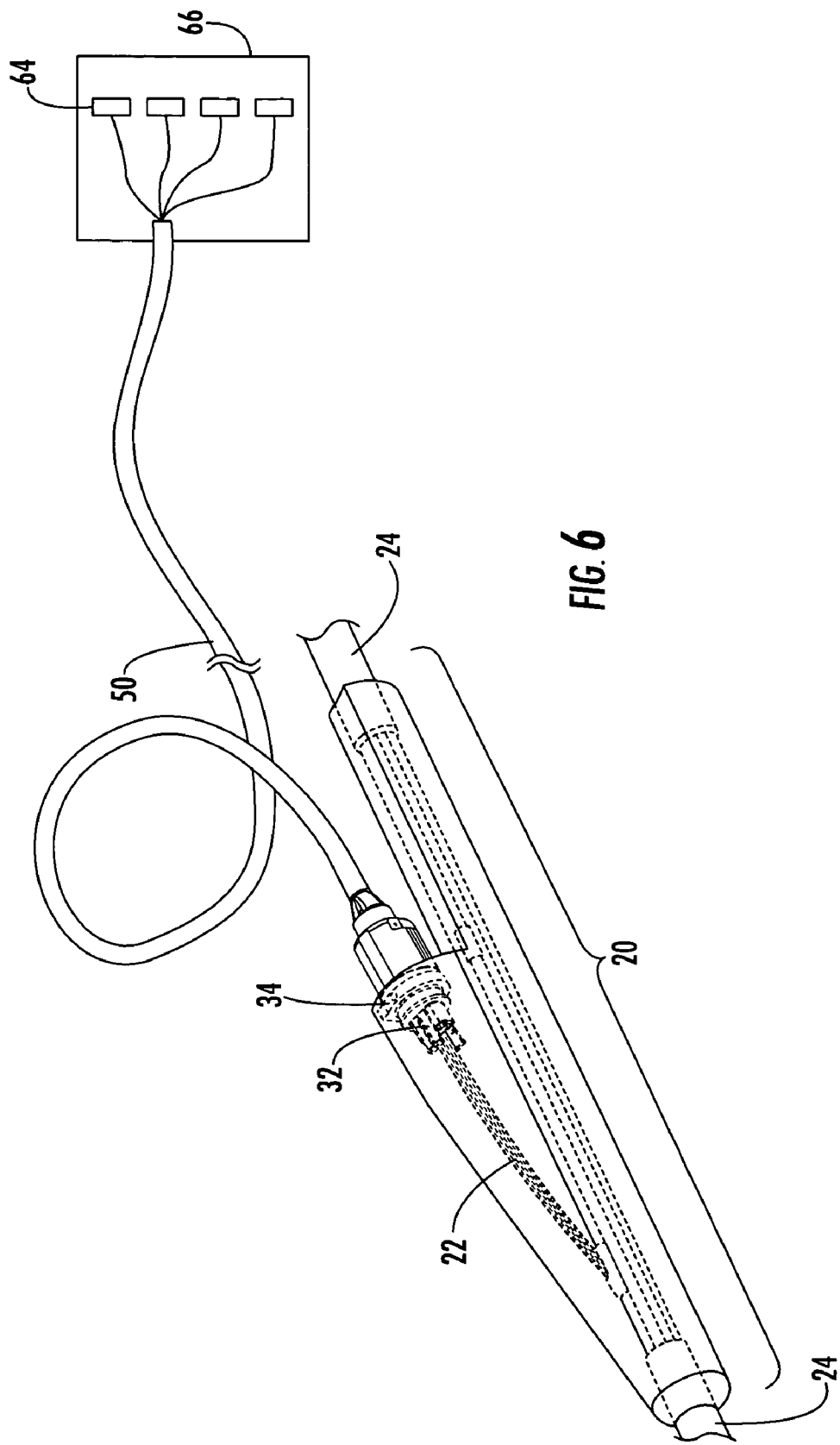
FIG. 6 is a perspective view of the pre-connectorized fiber optic distribution cable assembly of FIG. 2 shown with a fiber optic drop cable having a first end optically connected to the distribution cable and a second end optically connected to a network optical connection terminal.

Referring now to FIG. 6, a perspective view of a pre-connectorized distribution cable assembly having an overmolded mid-span access location 20 and a tether 50 with a first end of the tether 50 attached to a plurality of terminated optical fibers 22 of the distribution cable 24 is shown. As in the above embodiments, the tether 50 ensures that the terminated optical fibers 22 may be optically connected and routed to any desired location regardless of the position of the mid-span access location 20 after installation. The tether 50 permits the distribution cable assembly to be pre-engineered and manufactured without absolute accuracy in the placement of the mid-span access location 20. The second end of the tether 50 terminates in a plurality of individual optical connectors 64, or a multi-fiber connector (not shown), routed to a network optical connection terminal 66 at a network access point in a fiber optic communications network, such as but not limited to, a local convergence cabinet (LCC), an aerial closure, a below-grade closure, an above-ground pedestal, or a network interface device (NID) of the types available from Corning Cable Systems LLC of Hickory, N.C. Although not shown, one or more connectorized drop cables may be subsequently routed from the optical connection terminal 66 to subscriber premises in a known manner. In particular, the optical connection terminal 66 allows a field technician to readily connect, disconnect or reconfigure one or more drop cables extending to subscriber premises without disturbing the remaining drop cables. The optical connection terminal 66 may be positioned away from the distribution cable 24 at a desired location in the fiber optic communications network in order to compensate for span length measurement differences that typically result from network measurement miscalculations, installation errors, and differences between the proposed locations of telephone poles, hand holes, pedestals, etc. and their installed locations.

Figures 7, 8:
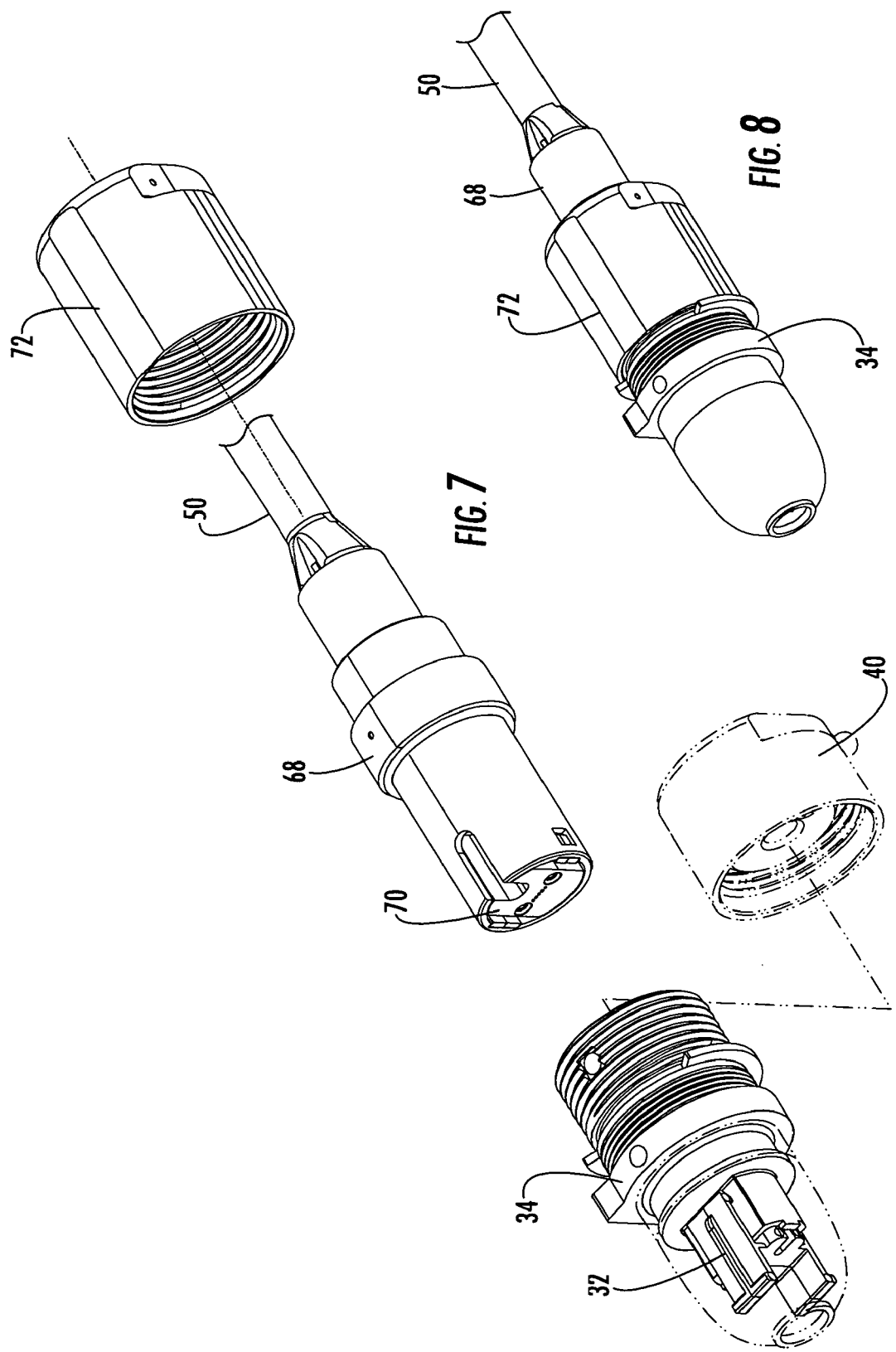
FIG. 7 is an exploded perspective view of an exemplary fiber optic receptacle and fiber optic plug adapted for use with the fiber optic distribution cable assembly of FIG. 2 shown in an unmated configuration.
FIG. 8 is a perspective view of the fiber optic receptacle and fiber optic plug of FIG. 7 shown in a mated configuration.

Referring now to FIGS. 7 and 8, a fiber optic receptacle and tether plug assembly according to one embodiment of the present invention is shown. The assembly includes a fiber optic receptacle 34 and a corresponding fiber optic plug 68. In the embodiments of the present invention shown and described herein, the receptacle 34 is disposed within the overmolded shell 36 at the mid-span access location 20 and the fiber optic plug 68 is attached to the first end of the tether 50. The receptacle 34 is operable for optically connecting the optical fibers 22 of the distribution cable 24 terminated and connectorized within the mid-span access location 20 with corresponding optical fibers of the tether 50 connectorized within the fiber optic plug 68. The plug 68 is mounted upon the first end of the tether 50 and is adapted to mate with the corresponding receptacle 34. The receptacle 34 is operable for optically aligning and maintaining the opposing ferrules 32, 70 in physical contact. Referring specifically to FIG. 7, the receptacle 34 and the corresponding plug 68 are shown unmated and with the protective dust caps 40 of the receptacle 34 removed. Although not shown, the plug 68 may likewise be provided with a protective duct cap to protect the ferrule 70 from impact and environmental damage. The plug 68 further comprise an internally threaded coupling nut 72 that is operable for securing the plug 68 to the receptacle 34 following insertion of the plug 68 into the receptacle 34. Referring specifically to FIG. 8, the fiber optic plug 68 is shown mated to the receptacle 34 by engaging the threaded coupling nut 72 with the externally threaded end of the receptacle 34 that extends outwardly from the overmolded shell 36 once the dust cap 40 is removed.

The exemplary embodiments of a distribution cable assembly comprising at least one mid-span access location 20 and a tether 50 according to the present invention shown and described herein provide a number of significant advantages over previously known distribution cable assemblies and factory-assembled interconnection solutions. The present distribution cable assembly provides the ability to install a distribution cable having one or more mid-span access locations 20 along the length of a distribution cable without absolute accuracy as to the actual location of the mid-span access relative to the desired location of the interconnection or "tap" points needed to connect subscribers to a fiber optic communications network. In particular, the distribution cable assembly of the preset invention mitigates and compensates for span length measurement differences between the distribution cable as installed and the pre-engineered distribution cable by providing pre-connectorized tether attach points for optically connecting a connectorized tether having a predetermined or customized length up to several thousand feet. As a result, the mid-span access location can be extended from its actual location to a desired location, such as a network access point located at a telephone pole, hand hole or network optical connection terminal. By installing the distribution cable and then measuring the distance from the accrual location of the mid-span access to the desired location of the network access point, a tether having a customized length can be attached at the mid-span access location and routed to the desired network access point without the need to manage a slack length of excess tether. By terminating the appropriate optical fibers 22 of the distribution cable 24 and overmolding the mid-span access location 20 with a protective overmolded shell 36 in the factory, field labor is reduced while maintaining installation flexibility. The mid-span access location 20 and the overmolded shell 36 have a low profile and are sufficiently flexible to permit the distribution cable assembly to be wound onto a cable reel, unreeled, shipped and installed through relatively small diameter conduit in a buried deployment and over sheave wheels and pulleys in an aerial deployment. In addition to the advantages described above, a distribution cable assembly constructed in accordance with the present invention provides a field technician with the ability to readily connect, disconnect and reconfigure optical connections at a convenient network access point (i.e., "tap point") regardless of the actual location of the factory-assembled and installed mid-span access location 20 along the length of the distribution cable 24. In all embodiments, the field technician is not required to enter the mid-span access location 20 in order to make subsequent optical connections to the terminated optical fibers 22 of the distribution cable 24, and the optical connections can be made at any time following initial installation of the distribution cable 24, thereby deferring additional material and labor costs associated with the tether 50, optical connection terminal and drop cables.

The foregoing is a description of various embodiments of the invention that are provided here by way of example only. Although the pre-connectorized fiber optic distribution cable has been described with reference to preferred embodiments and examples thereof, other embodiments and examples may perform similar functions and/or achieve similar results. All such equivalent embodiments and examples are within the spirit and scope of the present invention and are intended to be covered by the appended claims.

The invention claimed is:

1. A pre-connectorized fiber optic distribution cable assembly, comprising:
   a distribution cable comprising a plurality of optical fibers disposed within the distribution cable and at least one factory-assembled mid-span access location along the length of the distribution cable;
   at least one of the plurality of optical fibers of the distribution cable accessed and terminated from the distribution cable at the mid-span access location;
   at least one optical connector mounted upon the end of the at least one accessed and terminated optical fiber;
   a receptacle for receiving the at least one optical connector therein; and
   an injection molded shell encapsulating the mid-span access location, the at least one accessed and terminated optical fiber, the at least one connector and at least a portion of the receptacle, the receptacle providing access to the at least one optical connector without having to enter the shell.

2. The fiber optic distribution cable assembly of claim 1, further comprising a tether having a connectorized first end that is interconnected in the field with the at least one optical connector, wherein the tether is operable for mitigating span length differences in a pre-engineered fiber optic communications network.

3. The fiber optic distribution cable assembly of claim 2, wherein the tether comprises a second end opposite the first end terminating in a network optical connection terminal for optically connecting the distribution cable with a fiber drop cable or fiber optic branch cable.

4. The fiber optic distribution cable assembly of claim 3, wherein the second end of the tether is connectorized and disposed within the network optical connection terminal.

5. The fiber optic distribution cable assembly of claim 3, wherein the second end of the tether is connectorized and disposed within a multi-port connection terminal comprising at least one connector port.

6. The fiber optic distribution cable assembly of claim 2, wherein the tether has a length greater than about 3 feet.

7. The fiber optic distribution cable assembly of claim 1, wherein the at least one accessed and terminated optical fiber of the distribution cable is direct connectorized to the at least one optical connector and disposed within the injection molded shell.

8. The fiber optic distribution cable assembly of claim 1, wherein the at least one accessed and terminated optical fiber of the distribution cable is optically spliced to a length of optical fiber having the at least one optical connector mounted thereon and disposed within the injection molded shell.

9. The fiber optic distribution cable assembly of claim 1, wherein the at least one mid-span access location has a length of between about 12 and about 36 inches.

10. The fiber optic distribution cable assembly of claim 1, further comprising a removable cover for protecting and providing access to the receptacle.

11. The fiber optic distribution cable assembly of claim 1, wherein the receptacle comprises an alignment sleeve operable for receiving and aligning the at least one optical connector and a connectorized first end of a fiber optic drop cable or tether.

12. A fiber optic distribution cable assembly, comprising:
   a distribution cable comprising a tube containing a plurality of optical fibers and at least one factory-assembled mid-span access location along the length of the distribution cable;
   a plurality of optical fibers accessed and terminated from the distribution cable at the mid-span access location;
   a first multi-fiber connector mounted upon the ends of the optical fibers accessed and terminated from the distribution cable;
   a receptacle for receiving and aligning the first multi-fiber connection with a multi-fiber connector of a fiber optic cable in the field following installation of the distribution cable; and
   a tether comprising a plurality of optical fibers disposed within the tether, a second multi-fiber connector mounted upon the ends of the optical fibers at a first end of the tether and a second end opposite the first end terminating in a network optical connection terminal.

13. A fiber optic distribution cable assembly according to claim 12, further comprising a protective overmolded shell encapsulating the mid-span access location, the plurality of optical fibers accessed and terminated from the distribution cable, the first multi-fiber connector and at least a portion of the receptacle such that the tether can be attached to the first multi-fiber connector without entering the shell.

14. The fiber optic distribution cable assembly of claim 13, wherein the second multi-fiber connector is optically connected to the first multi-fiber connector through the receptacle.

15. The fiber optic distribution cable assembly of claim 12, wherein the tether is connectorized at the second end.

16. The fiber optic distribution cable assembly of claim 15, wherein the network optical connection terminal at the second end of the tether comprises at least one connector port for optically connecting the distribution cable to a fiber optic drop cable or fiber optic branch cable.

17. The fiber optic distribution cable assembly of claim 12, wherein the tether is splice-ready at the second end.

18. The fiber optic distribution cable assembly of claim 12, wherein the tether has a length greater than about 3 feet.

19. The fiber optic distribution cable assembly of claim 12, wherein the plurality of optical fibers accessed and terminated from the distribution cable are direct connectorized to the first multi-fiber connector.

20. The fiber optic distribution cable assembly of claim 12, wherein the plurality of optical fibers accessed and terminated from the distribution cable are optically spliced to a length of optical fibers having the first multi-fiber connector mounted upon their ends.

21. A method for mitigating a span length measurement difference in a pre-engineered fiber optic communications network employing a fiber optic distribution cable assembly comprising a distribution cable having a plurality of optical fibers disposed within a sheath and at least one mid-span access location along the length of the distribution cable, the method comprising:

removing a section of the sheath of the distribution cable at the mid-span access location;

accessing at least one of the plurality of optical fibers of the distribution cable within the section of the sheath removed from the distribution cable;

terminating the at least one optical fiber of the distribution cable accessed within the section of the sheath removed from the distribution cable;

connectorizing to at least one accessed and terminated optical fiber of the distribution cable;

injection molding around the mid-span access location and the at least one accessed, terminated and connectorized optical fiber of the distribution cable to produce an overmolded shell tat provides access to the at least one accessed, terminated and connectorized optical fiber without entering the shell.

22. The method of claim 21, further comprising installing the distribution cable assembly in the pro-engineered fiber optic communications network;

optically connecting a tether having a connectorized first end to the at least one accessed, terminated and connectorized optical fiber of the distribution cable at the mid-span access location; and positioning a second end of the tether opposite the first end at a desired location in the fiber optic communications network to compensate for the span length measurement difference.

23. The method of claim 22, wherein the first end of the tether is optically connected to the at least one accessed, terminated and connectorized optical fiber of the distribution cable at the mid-span access location through a receptacle operable for mating opposing optical connectors or ferrules.

* * * * *